United States Patent
Woo et al.

(10) Patent No.: US 9,710,046 B2
(45) Date of Patent: Jul. 18, 2017

(54) DISPLAY APPARATUS AND POWER SAVING METHOD THEREOF

(71) Applicant: LG INNOTEK CO., LTD., Seoul (KR)

(72) Inventors: Jeong Woo Woo, Seoul (KR); Jun Chul Kim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 275 days.

(21) Appl. No.: 13/835,578

(22) Filed: Mar. 15, 2013

(65) Prior Publication Data
US 2013/0311807 A1  Nov. 21, 2013

(30) Foreign Application Priority Data

May 15, 2012 (KR) .................. 10-2012-0051540

(51) Int. Cl.
*G06F 1/32* (2006.01)
*G06F 3/01* (2006.01)
(Continued)

(52) U.S. Cl.
CPC .......... *G06F 1/3234* (2013.01); *G06F 1/3231* (2013.01); *G06F 1/3203* (2013.01);
(Continued)

(58) Field of Classification Search
CPC .... G06F 1/3231; G06F 1/3234; G06F 1/3203; G06F 3/012; G06F 1/32; G06F 3/013; G06F 3/017; G06F 1/3243; Y02B 60/1289; H04H 60/33; H04H 60/65; H04N 21/42201; H04N 21/42203; H04N 21/4223
(Continued)

(56) References Cited

U.S. PATENT DOCUMENTS 5,194,951 A * 3/1993 Hailey et al. .................. 348/581
6,147,714 A * 11/2000 Terasawa ........... H04N 5/44508
348/564
(Continued)

FOREIGN PATENT DOCUMENTS

JP  2010-011015 A  1/2010
JP  2011-239029 A  11/2011
(Continued)

OTHER PUBLICATIONS

Notice of Allowance dated Dec. 2, 2013 in Korean Application No. 10-2012-0051540.
(Continued)

*Primary Examiner* — Jaweed A Abbaszadeh
*Assistant Examiner* — Terrell Johnson
(74) *Attorney, Agent, or Firm* — Saliwanchik, Lloyd & Eisenschenk

(57) ABSTRACT

Disclosed are a display apparatus and a power saving method thereof. The power saving method of a display apparatus includes acquiring an image by photographing surroundings of the display apparatus, detecting a human body region contained in the image by analyzing the acquired image, and entering a power saving mode by determining there is no user viewing the display apparatus if the human body region is not detected in the image.

10 Claims, 5 Drawing Sheets

(51) Int. Cl.
*H04N 21/422* (2011.01)
*H04H 60/65* (2008.01)
*H04H 60/33* (2008.01)
*H04N 21/4223* (2011.01)

(52) U.S. Cl.
CPC .............. *G06F 3/012* (2013.01); *G06F 3/013* (2013.01); *G06F 3/017* (2013.01); *H04H 60/33* (2013.01); *H04H 60/65* (2013.01); *H04N 21/4223* (2013.01); *H04N 21/42201* (2013.01); *H04N 21/42203* (2013.01); *Y02B 60/1289* (2013.01)

(58) Field of Classification Search
USPC .................................................. 713/300, 323
See application file for complete search history.

(56) References Cited

U.S. PATENT DOCUMENTS

| | | | |
|---|---|---|---|
| 2002/0047925 A1* | 4/2002 | Choi ............................ | 348/552 |
| 2004/0175020 A1* | 9/2004 | Bradski ................ | G06F 1/3203 382/103 |
| 2005/0071698 A1* | 3/2005 | Kangas ................ | G06F 1/3203 713/300 |
| 2005/0199783 A1* | 9/2005 | Wenstrand et al. ......... | 250/214.1 |
| 2007/0064159 A1* | 3/2007 | Kim ........................ | H04N 5/63 348/730 |
| 2007/0150760 A1* | 6/2007 | Nowlin ................. | G06F 1/3203 713/300 |
| 2009/0122737 A1* | 5/2009 | Twitchell, Jr. ................ | 370/311 |
| 2010/0107184 A1* | 4/2010 | Shintani ............. | H04N 21/4436 725/10 |
| 2012/0081282 A1* | 4/2012 | Chin ............................ | 345/156 |
| 2012/0254909 A1* | 10/2012 | Serdiuk ................. | H04N 7/163 725/12 |
| 2013/0311807 A1* | 11/2013 | Woo ...................... | G06F 1/3234 713/323 |

FOREIGN PATENT DOCUMENTS

KR 10-1997-0073045 A 11/1997
KR 10-2011-0004596 A 1/2011

OTHER PUBLICATIONS

Office Action dated Jun. 18, 2013 in Korean Application No. 10-2012-0051540, filed May 15, 2012.

* cited by examiner

DISPLAY APPARATUS AND POWER SAVING METHOD THEREOF

CROSS-REFERENCE TO RELATED APPLICATION

This application claims the benefit under 35 U.S.C. §119 of Korean Patent Application No. 10-2012-51540, filed May 15, 2012, which is hereby incorporated by reference in its entirety.

BACKGROUND

The embodiment relates to a display apparatus. In more particular, the embodiment relates to a display apparatus capable of detecting the presence state of a user by analyzing a camera image, and controlling the power to be supplied to the display apparatus according to the presence state of the user, and a power saving method thereof.

In general, as the standard of living is improved with the advance of technologies, the electronic products such as personal computers (PCs) and display apparatuses (e.g., TVs and monitors), VCRs, and DVDs have been popularly spread. Especially, the display apparatus has been extensively used at not only home, but also office and school.

In the case of the typical display apparatus, if a user gets to sleep without powering off the display apparatus in the middle of viewing the display apparatus at night, the display apparatus may keep operating as long as the display apparatus is powered off through an external input command.

In this case, if the display apparatus operates for a long time in the state that the user does not view the display apparatus, the life span of the expensive display panel or the life span of the power supply may be unnecessarily reduced.

In addition, the display apparatus having great power consumption may waste power unnecessarily.

Accordingly, in order to overcome the disadvantages caused in the typical display apparatus, a power saving mode according to the related art has been suggested.

Regarding the automatic power on/off function according to the related art, if a user sets power-on time and power-off time according to a time setting function, an embedded micro-computer continuously checks for the power-on time or the power-off time. The micro-computer automatically powers on the display apparatus if the power on-time comes, and powers off the display apparatus if the power off-time comes.

As described above, according to the power saving method of the related art, since the display apparatus is automatically powered off to enter a power saving mode only if the preset power-off time comes without considering the sleep state, the absence state, or the moving state of the user in the middle of viewing the display apparatus, the display apparatus according to the related art may not be effective.

For example, on the assumption that the user presets the power-off time to the extent that the display apparatus is powered off after 30 minutes from current time at night, even when the user gets to sleep in 5 minutes after the power-off time has been preset, the display apparatus is powered off after further operating for 25 minutes. Accordingly, the display apparatus may not be effective. In addition, on the assumption that the user presets the power-off time to the extent that the display apparatus is powered off after 30 minutes from current time, even when the user gets out of the seat thereof for a long time without powering off the display apparatus after viewing the display apparatus, the display apparatus is automatically powered off after operating till the power-off time. Accordingly, the display apparatus according to the related art is ineffective.

Meanwhile, in that state that the user may view the display apparatus without being in a sleep state after setting an automatic power-off time, the preset power-off time may arrive, so that the display apparatus may be automatically powered off. In this case, the user repeatedly powers on the display apparatus and sets the automatic power-off time. Accordingly, the power on/off scheme based on time may be ineffective.

BRIEF SUMMARY

The embodiment provides a display apparatus capable of selectively controlling the power of the display apparatus according to the presence of a user using the display apparatus, and a power saving method thereof.

In addition, the embodiment provides a display apparatus capable of selectively controlling the power of the display apparatus by recognizing the sleep state of a user based on the eye state of the user, and a power saving mode thereof.

Further, the embodiment provides a display apparatus capable of selectively controlling the power of the display apparatus by recognizing the sleep state of a user based on the motion pattern of the user, and a power-saving method thereof.

The technical objects which will be achieved in the proposed embodiments are not limited to the above, but other technical objects which are not mentioned will be apparently understood to those skilled in the art.

According to the embodiment, there is provided a power saving method of a display apparatus. The power saving method includes acquiring an image by photographing surroundings of the display apparatus, detecting a human body region contained in the image by analyzing the acquired image, and entering a power saving mode by determining there is no user viewing the display apparatus if the human body region is not detected in the image.

Meanwhile, according to the embodiment, there is provided a display apparatus including a power managing unit to manage a power supplied to components of the display apparatus, a camera to acquire an image by photographing surroundings of the display apparatus, a user recognizing unit to recognize a user viewing the display apparatus by analyzing the image acquired through the camera and detecting a human body region contained in the image, and a controller to determine a presence state of the user viewing the display apparatus according to a recognition result of the user recognizing unit, and to control entrance into a power saving mode based on the presence state of the user. The controller determines that the user is absent if the human body region is not detected from the image and controls the power managing unit to enter the power saving mode.

As described above, according to the embodiment, the power of the display apparatus can be controlled by using a camera-based user recognizing function, so that the unnecessary power consumption can be minimized.

In addition, according to the embodiment, when the user leaves the seat thereof for a second, only the video output is blocked in the state that the voice output is maintained, and, when the user returns to the seat thereof, the return of the user is detected so that the video output is resumed. Accordingly, the power consumption can be reduced without the inconvenience of the user.

In addition, according to the embodiment, even if the user is present at the front of the display apparatus, if the user does not move for a predetermined time, the power of the display apparatus is controlled, so that the purposeless power consumption can be reduced.

DETAILED DESCRIPTION

Figure 1:
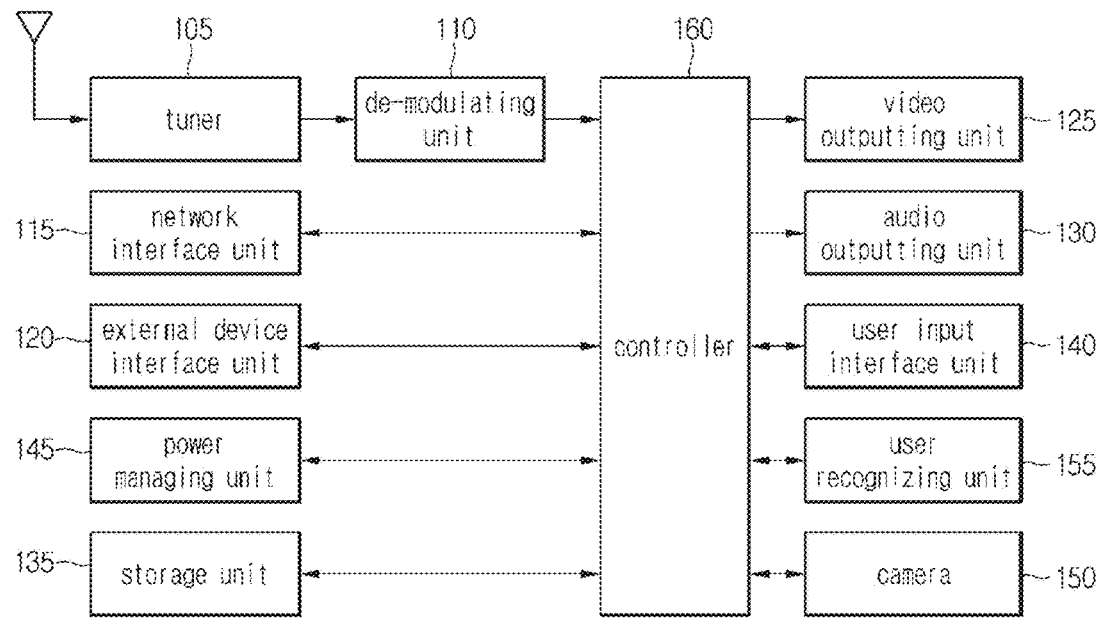
FIG. 1 is a block diagram showing the structure of the display apparatus according to the embodiment.

The embodiment of the disclosure will be described in detail with reference to accompanying drawings, so that those skilled in the art to which the disclosure pertains can easily realize the embodiment. However, the disclosure can be realized in various modifications, and is not limited to the embodiment.

In the following description, when a predetermined part "includes" a predetermined component, the predetermined part does not exclude other components, but may further include other components if there is a specific opposite description.

The thickness and size of each layer shown in the drawings may be exaggerated, omitted or schematically drawn for the purpose of convenience or clarity. In addition, the size of elements does not utterly reflect actual size. The same reference numbers will be assigned the same elements throughout the drawings.

FIG. 1 is a view showing the structure of a display apparatus 100 according to the first embodiment.

Referring to FIG. 1, the display apparatus 100 includes a tuner 105, a demodulating unit 110, a network interface unit 115, an external device interface unit 120, a video outputting unit 125, an audio outputting unit 130, a storage unit 135, a user input interface unit 140, a power managing unit 145, a camera 150, a user recognizing unit 155, and a controller.

The tuner 105 tunes RF broadcasting signals, which correspond to a user-selected channel or correspond to all previously-stored channels, from among radio frequency (RF) broadcasting signals received through an antenna. In addition, the tuner 105 converts the selected RF broadcasting signals into intermediate frequency signals or base-band image/voice signal.

For example, if the selected RF broadcasting signal is a digital broadcasting signal, the tuner 105 converts the selected RF broadcasting signal into a digital IF (DIF) signal. If the selected analogue broadcasting signal is a digital broadcasting signal, the tuner 105 converts the selected RF broadcasting signal into an analogue base band image/voice signal (CVBS/SIF).

In other words, the tuner 105 may process the digital broadcasting signal or the analog broadcasting signal. The analogue base band image/voice signal (CVBS/SIF) output from the tuner 105 may be directly input to the controller 160.

In addition, the tuner 105 may receive RF broadcasting signals having a single carrier according to an advanced television system committee (ATSC) scheme and RF broadcasting signals having a plurality of carriers according to a digital video broadcasting (DVB) scheme.

Meanwhile, the tuner 105 sequentially tunes RF broadcasting signals of all broadcasting channels, which are stored through a channel memorizing function, from among RF broadcasting signals received through the antenna, and converts the RF broadcasting signals into intermediate signals or base band image/voice signals.

The demodulating unit 110 receives a digital IF (DIF) signal converted by the tuner 105 to perform a demodulation function.

For example, the demodulating unit 110 performs an 8-VSB (7-Vestigal Side Band) demodulation scheme if the DIF signal output from the tuner 105 is based on the ATSC scheme. In addition, the demodulating unit 110 may perform channel decoding. To this end, the demodulating unit 110 includes a trellis decoder, a de-interleaver, and a reed Solomon decoder to perform trellis decoding, de-interleaving, and reed Solomon decoding.

For example, if the DIF signal output from the tuner 105 is based on a DVB scheme, the demodulating unit 110 performs a coded orthogonal frequency division multiplexing (COFDMA) scheme. In addition, the demodulating unit 110 may perform channel decoding. To this end, the demodulating unit 110 may include a convolution decoder, a de-interleaver, and a reed Solomon decoder to perform trellis decoding, de-interleaving, and reed Solomon decoding.

The demodulating unit 110 may output a stream signal TS after performing the demodulation and the channel decoding. In this case, the stream signal may be a signal obtained by multiplexing video signals, voice signals, or data signals. For example, the stream signal may include an MPEG-2 TS (transport stream) obtained by multiplexing video signals based on an MPEG-2 standard and voice signals based on a dolby AC-3 standard. In detail, the MPEG-2 TS may contain a 4-byte header and a 184-byte payload.

Meanwhile, demodulating units 110 may be separately provided according to the ATSC scheme and a DVB scheme. In other words, the demodulating units 110 may include an ATSC demodulating unit and a DVB demodulating unit.

The stream signal output from the demodulating unit 110 may be input to the controller 160. After performing the de-multiplexing operation, and an image/video signal processing operation, the controller 160 outputs a video to the video outputting unit 125, and outputs voice to the audio outputting unit 130.

The network interface unit 115 provides an interface to the display apparatus 100 to a wired/wireless network including the Internet. The network interface unit 115 may have an Ethernet connector for the connection with the wired network, and may use wireless LAN (WLAN) (Wi-Fi), wireless broadband (Wibro), world interoperability for microwave access (Wimax), and high speed downlink packet access (HSDPA) communication standards for the connection with the wireless network.

The network interface unit 115 may receive contents or data provided by an Internet provider, a contents provider, or a network administrator through the network. In other words, the network interface unit 115 may receive contents such as films, advertisements, games, VOD service, or broadcasting signals, which are provided from the Internet provider or the contents provider, and the related information through the network. In addition, the network interface unit 115 may receive the information of the update of firmware and update files provided by the network administrator. Further, the network interface unit 115 may transmit data to the Internet provider, the contents provider, or the network administrator.

In addition, for example, the network interface unit 115 may be connected to an Internet protocol (IP) TV. In this case, the network interface unit 115 may receive video signals, voice signal, or data signals, which are subject to signal processing in a set-top box for the IPTV, and send the signals to the controller 160, and may transmit signals, which are processed in the controller 160, to the set-top box for the IPTV, so that the bi-directional communication is made.

Meanwhile, the IPTV may include an ADSL-TV, a VDSL-TV, or an FTTH-TV according to a network type. In addition, the IPTV may include a TV over DSL, a video over DSL, a TV overIP(TVIP), or a broadband TV(BTV). In addition, the IPTV may include an Internet TV or a full-browsing TV that is accessible to the Internet.

The external device interface unit 120 may make communication with an external device connected thereto. To this end, the external device interface unit 120 may include an A/V input/output unit (not shown) or a wireless communication unit (not shown).

The external device interface unit 120 may be connected to a digital versatile disk (DVD), a Blu ray, a game device, a camera, a camcorder, or a computer (laptop computer) through a wired/wireless scheme. The external device interface unit 120 sends video signals, voice signals, or data signals, which are input from the outside through the connected external device, to the controller 160 of the display apparatus 100. In addition, the external device interface unit 120 may output video signals, voice signals, or data signals, which are processed by the controller 160, to the external device. To this end, the external device interface unit 120 may include an A/V input/output unit (not shown) or a wireless communication unit (not shown).

The A/V input/output unit may include a USB terminal, a CVBS (Composite Video Banking Sync) terminal, a component terminal, an S-video terminal (analogue), a digital visual interface (DVI) terminal, a high definition multimedia interface (HDMI) terminal, an RGB terminal, or a D-SUB terminal so that the video and voice signals of the external device may be input to the display apparatus 100.

The wireless communication unit may perform short-range wireless communication with another electronic device. The display apparatus 100 may be networked with another electronic device according to the communication standards such as Bluetooth, Radio Frequency Identification (RFID), Infrared Data Association (IrDA), Ultra Wideband (UWB), ZigBee, and Digital Living Network Alliance (DLNA).

In addition, the external device interface unit 120 may be connected to various set-top boxes through at least one of various terminals to perform input/output operations together with the set-top boxes.

The video outputting unit 125 converts video signals, data signals, OSD signals, and control signals which are processed in the controller 160, or video signals, data signals, or control signals received from the external device interface unit 120 to generate driving signals.

The video outputting unit 125 may be realized by using a PDP, an LCD, an OLED, or a flexible display.

Meanwhile, the video outputting unit 125 includes a touch screen to serve as an input device in addition to the output device.

The audio outputting unit 130 receives voice-processed signals of the controller 160, for example, stereo signals, 3.1-channel signals, or 5.1-channel signals and outputs voice. The audio outputting unit 130 may be realized by using various types of speakers.

The storage unit 135 may store therein programs for the processing and the controlling of various signals in the controller 160, or may store therein video signals, voice signals, or data signals, which are subject to signal processing.

In addition, the storage unit 135 may temporarily store video signals, voice signals, or data signals which are input to the external device interface unit 120. In addition, the storage unit 135 may store information of a predetermined broadcasting channel through a channel memorizing function such as a channel map.

The storage unit 135 may include at least one of storage media such as a flash memory type of a memory, a hard disk type of a memory, a multimedia card micro type of a memory, a card type of a memory (e.g., SD memory or XD memory), a RAM, and a ROM (EEPROM). The display apparatus 100 may provide files (moving picture files, still image files, music files, and document files) stored in the storage unit 135 to a user by playing the files.

Although FIG. 1 shows the embodiment in which the storage unit 135 is separately provided from the controller 160, the disclosure is not limited thereto. The storage unit 135 may be embedded in the controller 160.

The user input interface unit 140 may send a signal input by a user to the controller 160, or may send a signal, which is output from the controller 160, to the user.

For example, the user input interface unit 140 may receive user input signals such as the power on/off, channel selection, and screen image settings from a remote controller (not shown) according to various communication schemes such as a radio frequency (RF) communication scheme and an infrared (IR) communication scheme, or may transmit signals, which are output from the controller 160, to the remote controller.

In addition, for example, the user input interface unit 140 may send the user input signals, which are input through local keys (not shown) such as a power key, a channel selection key, a volume key, and a setting key, to the controller 160.

In addition, for example, the user input interface unit 140 may send the user input signal, which is input from a sensing unit (not shown) to sense the gesture of a user, to the controller 160, or may transmit the signal, which is output from the controller 160, to the sensing unit (not shown). In this case, the sensing unit (not shown) may include a touch sensor, a voice sensor, a position sensor, and an operating sensor.

The power managing unit 145 manages the power of components constituting the display apparatus 100.

For example, the power managing unit 145 supplies power to only a specific component including the controller 160 when entering a power saving mode.

In addition, the power managing unit 145 manages power supplied to each component according to a power on/off command input through the user input interface unit 140.

In other words, the power managing unit 145 performs a power-saving function according to a power control signal sent from the controller 160. The power managing unit 145 manages unnecessary power consumption by performing the power-saving function when the user does not use the display apparatus 100 for a predetermined time.

The camera 150 is mounted in the display apparatus 100 to take a front image of the display apparatus 100.

In this case, according to the embodiment, although only one camera 150 is shown for the illustrative purpose, a plurality of cameras 150 may be provided to take front surface, lateral side, and rear surface images of the display apparatus 100.

The user recognizing unit 155 receives the images taken by the camera 150, and analyzes the received images, thereby performing a user recognizing operation.

For example, the user recognizing unit 155 detects the human body of the user from the image taken by the camera 150.

In addition, if the human body of the user is detected, the user recognizing unit 155 detects the face of the user from the detected human body of the user.

Further, if the face of the user is detected, the user recognizing unit 155 recognizes the eye state of the user based on the facial features of the user.

In addition, if the face of the user is not detected from the human body of the user, the user recognizing unit 155 analyzes the motion pattern of the user by using a plurality of images taken by the cameras 150.

In this case, in order to analyze the statuses (human body detection, face detection, eye state recognition, and motion pattern analysis) of the user, the user recognizing unit 155 stores learning information corresponding to the statuses of the user, and analyzes the statuses of the user based on the stored learning information.

In addition, in order to accept the variation of the surrounding environment of the display apparatus 100 or the unique motion patterns of the user, the user recognizing unit 155 keeps learning based on the stored learning information, and updates the stored learning information based on the information resulting from the recognition.

The controller 160 controls the overall operation of the display apparatus 100.

For example, the controller 160 may control the tuner 150 to tune RF broadcasting corresponding to a user-selected channel or a previously-stored channel.

In addition, the controller 160 may control the display apparatus through the user command, which is input through the user input interface unit 140, or an internal program.

For example, the controller 160 controls the tuner 105 so that the signals of the channel selected according to a predetermined channel selection command received through the user input interface unit 140 are input. In addition, the controller 160 processes video signals, voice signals, or data signals of the selected channel. The controller 160 outputs the information of the user-selected channel through the video outputting unit 125 or the audio outputting unit 130 together with the processed video signals, voice signals, or data signals.

Alternatively, the controller 160 controls the video outputting unit 125 or the audio outputting unit 130 to output the video signals or the voice signals of an external device (e.g., camera or camcorder), which are input through the external device interface unit 120, according to an external device video play command received through the user input interface unit 140.

Meanwhile, the controller 160 may control the video outputting unit 125 to display a video. For example, the controller 160 may control the video outputting unit 125 to display a broadcasting video input through the tuner 105, an external input video input through the external device interface unit 120, a video input through the network interface unit 115, or a video stored in the storage unit 135.

In this case, the video outputting unit 125 may display a still image or a moving picture. In addition, the video outputting unit 125 may display 2D images or 3D images.

Further, the controller 160 controls the power managing unit 145 according to the presence state of the user which is recognized through the user recognizing unit 155.

For example, if there is no user recognized through the user recognizing unit 155, the controller 160 controls the power managing unit 145 to enter the power saving mode, that is, to shut off power to be supplied to a specific component.

In addition, if there is a user recognized through the user recognizing unit 155, the controller 160 controls the power managing unit 145 to get out of the power saving mode, that is, to keep supplying power.

In addition, if a user is recognized as being present, the controller 160 controls the power managing unit 145 according to the states of the user.

In other words, if the user is recognized as being present, the controller 160 recognizes the face of the user, and detects the eye state according to the recognition of the face.

In addition, if the detected eye state is a closed state, that is, a sleep state, the controller 160 controls the entrance into the power saving mode.

Meanwhile, if the face of the user is not recognized, the controller 160 analyzes the motion pattern of the user based on a plurality of photographs.

In addition, if the analyzed motion pattern of the user represents the sleep state of the user (i.e., if the user does not move for a predetermined time), the controller 160 controls the entrance into the power saving mode.

However, if the eye state of the user is an open state, or if the motion pattern of the user represents an awaken state, the controller 160 cancels the power saving mode, or allows the continuous power supply.

Meanwhile, the controller 160 controls the entrance into the power saving mode in a plurality of steps.

In other words, if the first condition to enter the power saving mode is satisfied (i.e., if a user is absent, or the user is in the sleep state), the controller 160 determines if the first condition is continuously detected for the first time.

In this case, the first time may be set by the user. For example, the first time may be set to 30 seconds or one minute.

Subsequently, if the first condition is detected for the first time, the controller 160 controls the entrance into the first power saving mode.

In this case, the first power saving mode is to shut off power to be supplied to a portion of components constituting the display apparatus 100.

In other words, if the first condition is detected for the first time, the controller 160 continuously supplies power to components for outputting voice, and shuts off only power to be supplied to components for outputting a video.

In addition, if the first condition is detected even for the second time after the first time has elapsed, the controller 160 controls the entrance into the second power saving mode.

In other words, if the first condition is detected even after two hours have elapsed, the controller 160 shuts off not only power to be supplied to the components for outputting voice, but also power to be supplied to the whole components.

In this case, the controller 160 continuously supplies power to components (e.g., the camera 150 or the user recognizing unit 155) to recognize the user, so that the components can continuously recognize the user.

Meanwhile, if the user gets to sleep in the middle of viewing a specific broadcasting program, the viewing of the specific broadcasting program by the user is stopped.

Accordingly, if the entrance into the power saving mode is performed as the user gets to sleep, the controller 160 stores the broadcasting program viewed by the user in the storage unit 135.

In addition, if the condition to cancel the power saving mode is detected in the middle of storing the program, the controller 160 displays a message to inform the user that there is a video stored in the storage unit 135 in the entrance into the power saving mode, and plays the stored video.

The display apparatus 100 may include a stationary-type digital broadcasting receiver that may receive at least one of ATSC (7-VSB) type digital broadcasting, DVB-T (COFDM) type digital broadcasting, and ISDB-T (BST-OFDM) type digital broadcasting. The display apparatus 100 may include a movable-type digital broadcasting receiver that may receive at least one of terrestrial DMB-type, satellite DMB-type, ATSC-M/H-type, DVB-H (COFDM)-type, and Media Forward Link Only-type digital broadcasting. In addition, the display apparatus 100 may include a digital broadcasting receiver for the cable broadcasting, satellite communication, and an IPTV.

Meanwhile, the display apparatus 100 in the subject specification may include a TV set, a cellular phone, a smart phone, a laptop computer, a terminal for digital broadcasting, personal digital assistants (PDA), and a portable multimedia player (PMP).

Meanwhile, FIG. 1 is a block diagram showing the display apparatus 100 according to one embodiment. Components constituting the display apparatus 2100 may be integrated with each other, or omitted, or another component may be added to the above components according to requirements. In other words, at least two components may be integrated with each other in one form, or one component may be divided into at least two components. In addition, the function performed in each block is provided for the illustrative purpose, and the detailed operation or device thereof does not restrict the scope of the disclosure.

Figure 2:
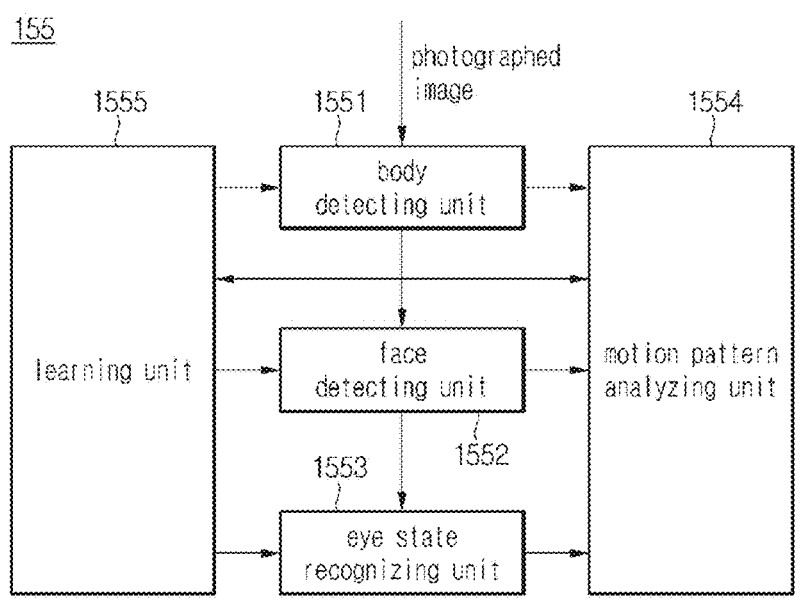
FIG. 2 is a block diagram showing the detailed structure of a user recognizing unit shown in FIG. 1.

FIG. 2 is a block diagram showing the detailed structure of the user recognizing unit 155 shown in FIG. 1.

Referring to FIG. 2, the user recognizing unit 155 includes a human body detecting unit 1551, a face detecting unit 1552, an eye state recognizing unit 1553, a motion pattern analyzing unit 1554, and a learning unit 1555.

The human body detecting unit 1551 receives the image taken by the camera 150 and determines if a user is present in the received image, based on the received image.

The human body detecting unit 1551 determines the presence state of the user from the image taken by the camera 150 through a vision technology.

In this case, if the human body detecting unit 1551 determines that the user is present in the image, the image is sent to the face detecting unit 1552.

The face detecting unit 1552 detects the face region existing in the image as the user is determined as being present in the image.

For example, the face detecting unit 1552 performs segmentation for the image of each subject through outline detection, a labeling scheme, and a structural analysis, extracts the features of each region from the segmented image to detect the face region.

In this case, the face recognizing unit 1552 may use a feature vector generated by extracting and processing the features such as colors, shapes, and textures by applying a mathematics unit, a structural unit, and a transformation unit to the regions of each subject.

If the face is detected through the face detecting unit 1552, the detected face image is sent to the eye state recognizing unit 1553.

In addition, if the face of the user is not detected through the face detecting unit 1552, the acquired image is sent to the motion pattern analyzing unit 1554.

In this case, although the user is determined as being present, if the face region is not detected, only a portion of the human body may be photographed or the back of the user may be photographed instead of the face of the user.

The eye state recognizing unit 1553 detects an eye region from the detected face image if the face of the user is detected by the face detecting unit 1552.

In addition, the eye state recognizing unit 1553 detects the eye region, in which the eyes of the user are located, by analyzing the features of the face image.

Thereafter, the eye state recognizing unit 1553 analyzes the eye region if the eye region is detected, and determines the eye state of the user.

In other words, the eye state recognizing unit 1553 determines if the eye of the user is closed or open by analyzing the eye region. The eye state may be detected by using the color of the eye region.

Then, the eye state recognizing unit 1553 sends the information of the eye state to the controller 160.

Meanwhile, the motion pattern analyzing unit 1554 analyzes a plurality of images taken by the camera 150 to analyze the motion pattern of the user as the face region is not detected.

In other words, the motion pattern analyzing unit 1554 determines if there is the motion of the user by using the plural images and determines the motion degree if there is the motion of the user.

In addition, the motion pattern analyzing unit 1554 sends the motion pattern information according to the motion degree to the controller 160.

The learning unit 1555 stores information required to operate the human body detecting unit 1551, the face detecting unit 1552, the eye state recognizing unit 1553, and the motion pattern analyzing unit 1554.

For example, the learning unit 1555 stores information of the variation in the surrounding environment of the display apparatus or the information of the unique motion pattern of the user. In this case, the information of the unique motion pattern may include information of the sleeping pattern of the user or the unique posture in viewing a TV.

Hereinafter, the power saving method of the display apparatus according to the embodiment will be described with reference to accompanying drawings.

FIGS. 3 to 6 are flowcharts showing the power saving method of the display apparatus according to the embodiment.

Figure 3:
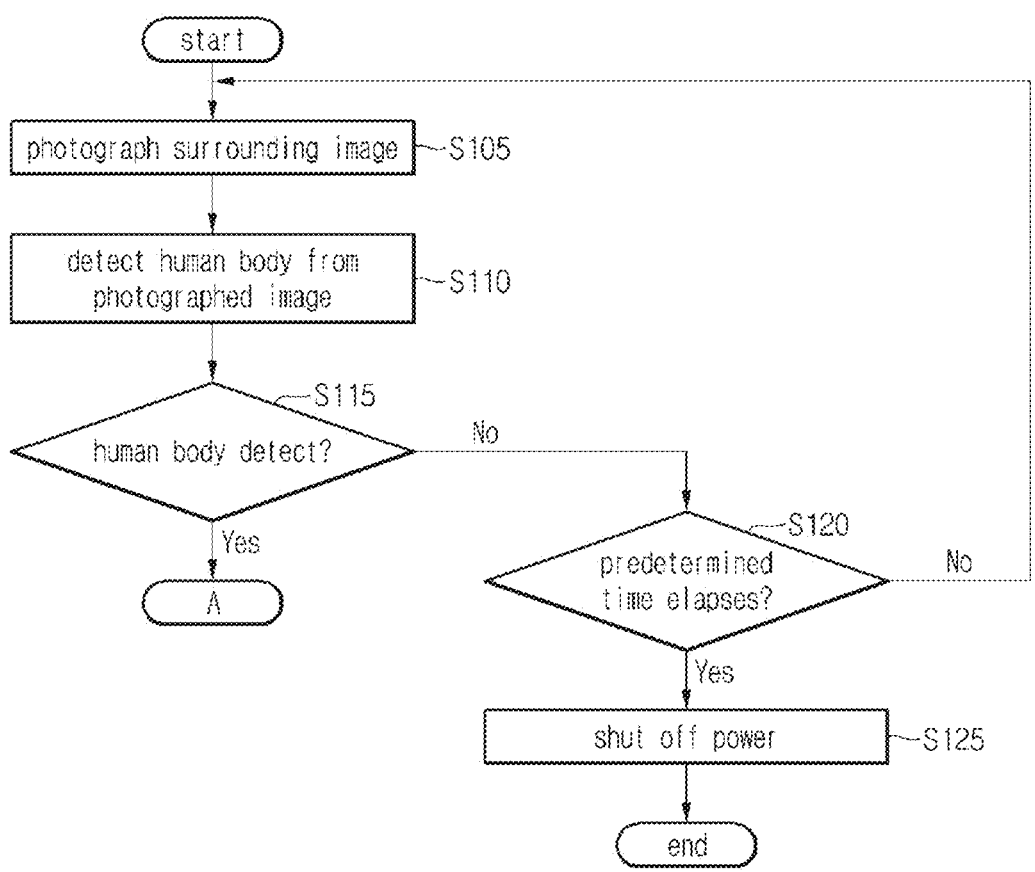
FIGS. 3 to 6 are flowcharts showing a power saving method of the display apparatus according to the embodiment.

Referring to FIG. 3, the camera 150 photographs the surroundings of the display apparatus and acquires an image according to the photographing (step 105).

Thereafter, the human body detecting unit 1551 analyzes the image acquired through the camera 150, and detects a human body existing in the analyzed image (step 110).

The controller 160 determines if the human body is detected by the human body detecting unit 1551 (step 115).

If the human body is detected as the determination result of step S115 (if the user exists around the display apparatus), "A" performed.

However, if the human body is not detected as the determination result (step S115) (if the user does not exist around the display apparatus), it is determined if the human body is not detected for a predetermined time (step S120).

If the human body is not detected for a predetermined time as the determination result of step S120, the controller 160 outputs a control signal to enter the power saving mode, and the power managing unit 145 shuts off the power supplied to a specific component in order to enter the power saving mode according to the control signal of the controller 160 (step S125).

Figure 4:
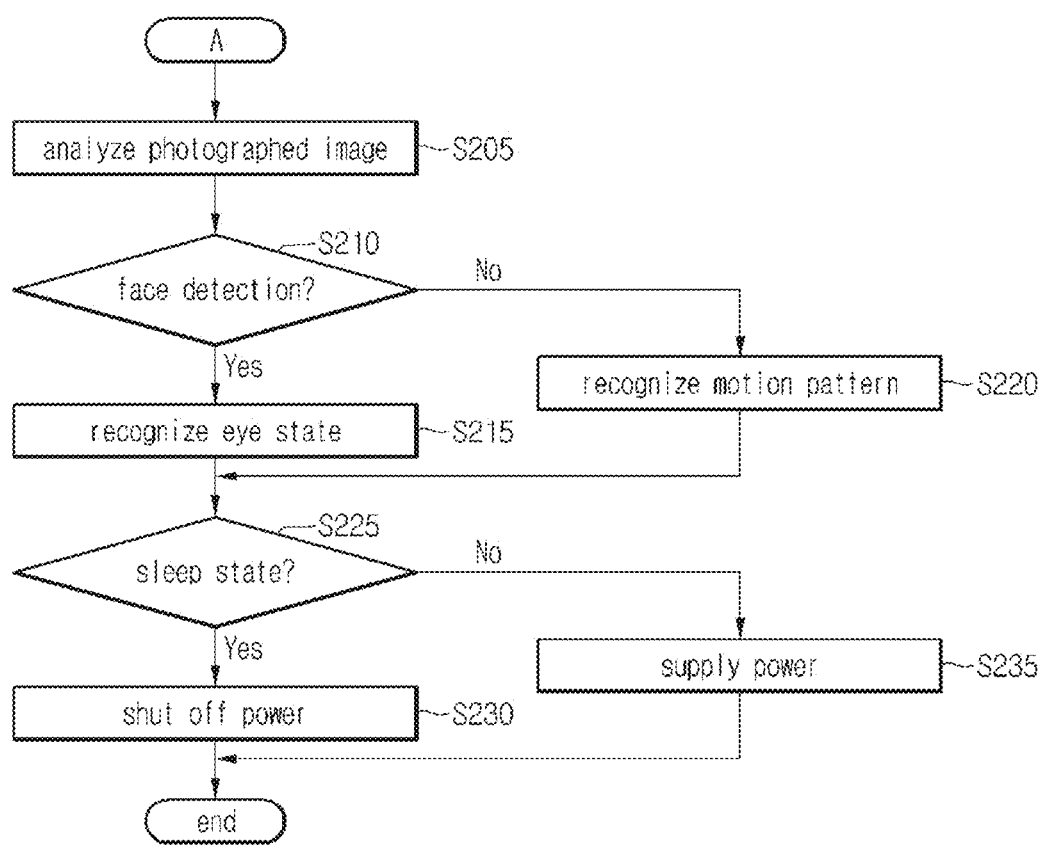

Next, referring to FIG. 4, if the human body is detected as the determination result (step 115), the face detecting unit 1552 detects the face of the user from the human body region existing in the image (step S205).

The controller 160 determines if the face of the user is detected through the face recognizing unit 1552 (step S210).

If the face of the user is detected as the determination result (step S210), the controller 160 sends the image on the detected face region to the eye state recognizing unit 1553 to recognize the eye state existing in the face region.

The eye state recognizing unit 1553 analyzes the face region according to the control of the controller 160 to recognize the eye state (step S215).

Meanwhile, if the face is not detected as the determination result (step S210), the controller 160 sends the image on the human body region existing in the plural images to the motion pattern analyzing unit 1554 to recognize the motion pattern of the user.

Thereafter, the motion pattern analyzing unit 1554 recognizes the motion pattern of the user by analyzing the plural images (step S220). In other words, the motion pattern analyzing unit 1554 detects the motion degree of the user.

Thereafter, the controller 160 determines if the user is currently in a sleep state (step S225). In other words, the controller 160 determines if the eye state recognized through the eye state recognizing unit 1553 is a closed state, or if the motion degree of the user analyzed through the motion pattern analyzing unit 1554 is slight.

Subsequently, if the user is in the sleep state, the controller 160 allows the entrance into the power saving mode to shut off the power supplied to a specific component (step S230).

In addition, if the user is not in the sleep state, the controller 160 cancels the power saving mode or allows the continuous power supply to each component (step S235).

Figure 5:
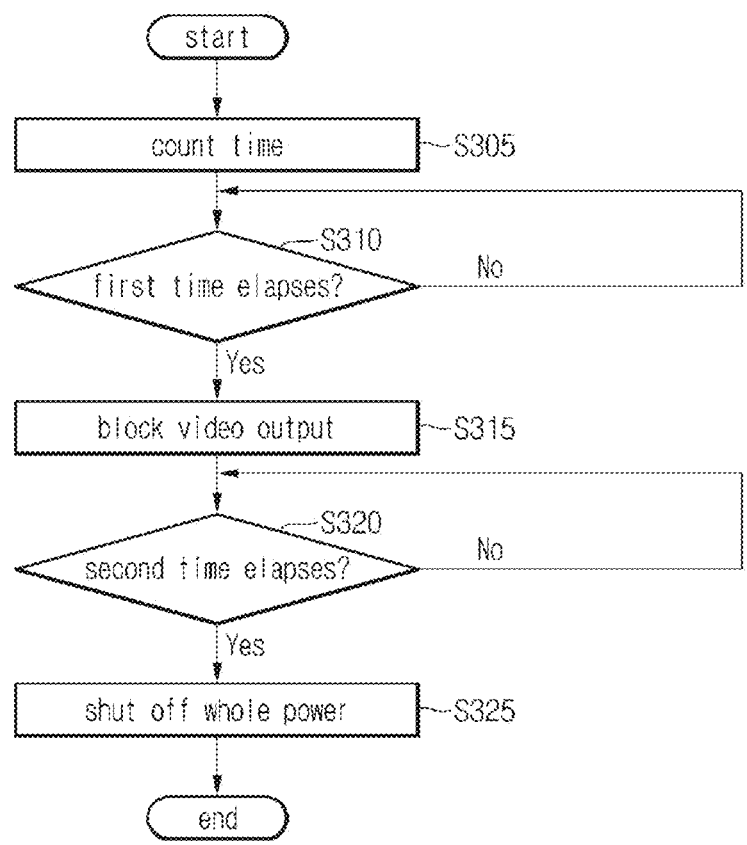

Then, referring to FIG. 5, if the human body is not detected or the user is in the sleep state, the controller 160 counts time (step S305).

Thereafter, the controller 160 determines if the first time elapses (step S310).

In other words, the controller 160 determines if the first time elapses from a time point at which the human body is not detected, or a time point at which the user is in the sleep state.

Subsequently, the controller 160 blocks the output of the image if the first time has elapsed (step S315), in other words, the controller 160 shuts off the power supplied to the components required to output images to control the entrance into the first power saving mode.

Thereafter, the controller 160 determines if the second time elapses from the entrance into the first power saving mode (step S320).

In other words, the controller 160 determines if the second time elapses from the time point, at which the human body is not detected, or a time point at which the user is in the sleep state.

Thereafter, if the second time has elapsed, the controller 160 blocks not only the video output, but also the voice output if the second time has elapsed (step S325).

In other words, the controller 160 shuts off the power to be supplied whole components except for the component for the user detection to allow the entrance into the second power saving mode.

Figure 6:
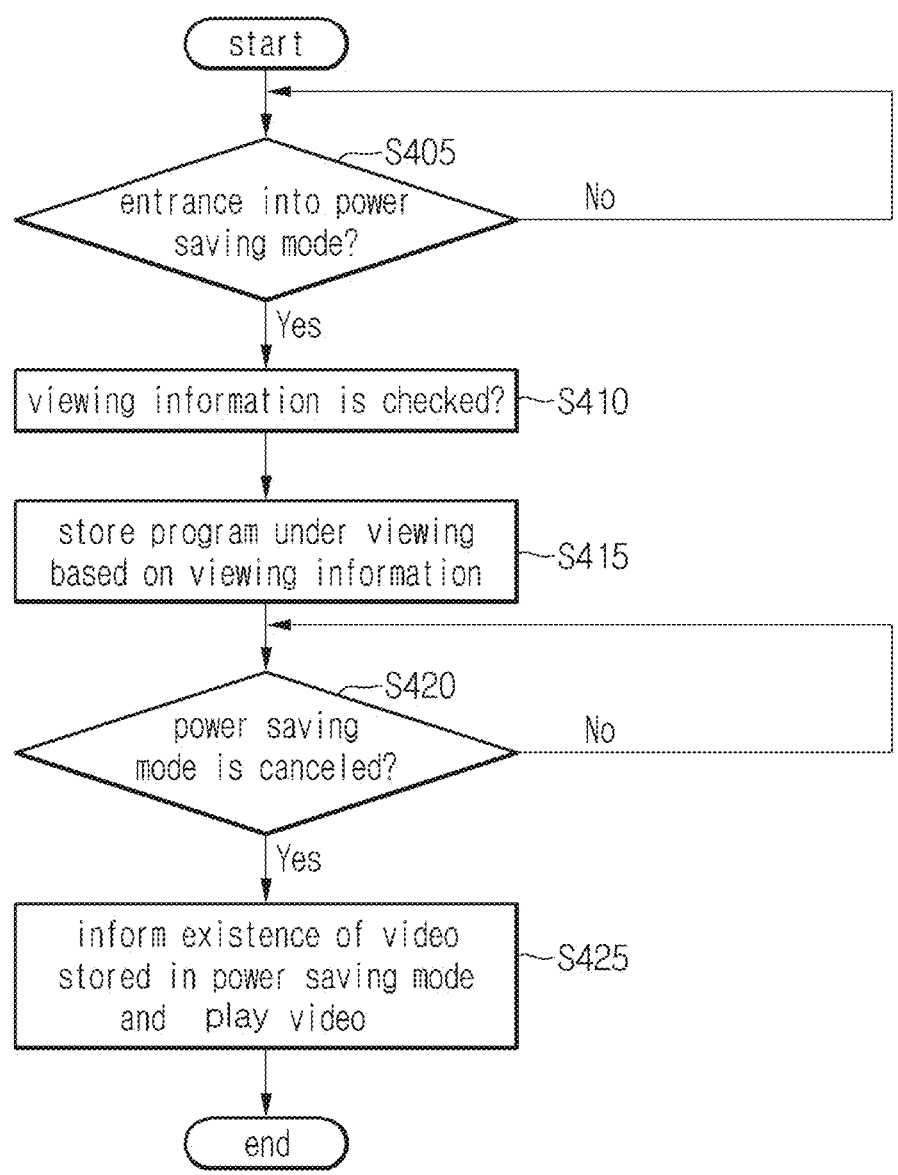

Next, referring to FIG. 6, the controller 160 determines if the entrance into the power saving mode is performed (step S405).

Thereafter, if the entrance into the power saving mode is performed, the controller 160 detects the viewing information of the broadcasting program which is viewed by the user before the entrance into the power saving mode (step S410).

If the viewing information is detected, the controller 160 stores the broadcasting program, which is viewed by the user, in the storage unit 135 by using the viewing information (step S415).

Thereafter, the controller 160 determines if the power saving mode is canceled (step S420).

If the power saving mode is canceled, the controller 160 displays a message to inform a user of the existence of the video, which is stored in the entrance into the power saving mode, and plays the stored video according to the request of the user (step S425).

As described above, according to the embodiment, the power of the display apparatus can be controlled by using a camera-based user recognizing function, so that the unnecessary power consumption can be minimized.

In addition, according to the embodiment, when the user leaves the seat thereof for a second, only the video output is blocked in the state that the voice output is maintained, and, when the user returns to the seat thereof, the return of the user is detected so that the video output is resumed. Accordingly, the power consumption can be reduced without the inconvenience of the user.

In addition, according to the embodiment, even if the user is present at the front of the display apparatus, if the user does not move for a predetermined time, the power of the display apparatus is controlled, so that the purposeless power consumption can be reduced.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A power saving method of a display apparatus, the power saving method comprising:
    receiving a broadcasting signal corresponding to a channel selection command by a tuner;
    outputting a video signal and an audio signal of the received broadcasting signal;
    acquiring an image by photographing surroundings of the display apparatus;

detecting a human body region contained in the image by analyzing the acquired image;

detecting a viewing state of the user by analyzing the human body region and determining if the human body region is detected in the image;

entering a power saving mode when there is no user viewing the display apparatus by determining if the human body region is not detected in the image or when the user viewing the display apparatus is in a sleep state by determining if the eye region of the user is in a closed state, or if the motion of the human body region is not changed;

initiating a storage of the broadcasting signal in a storage unit when the power saving mode is entered; and displaying a message to inform a user of the storage of the broadcasting signal in the storage unit when the power saving mode is canceled;

wherein the detecting of the viewing state of the user includes:

detecting a face region in the detected human body region;

detecting an eye region in the face region;

detecting an eye state of the user by analyzing the detected eye region;

analyzing a motion pattern by analyzing a change in motion of human body regions detected in a plurality of images if the face region is not detected in the human body region;

storing learning information to detect the human body region, the face region, and the eye region, to recognize an eye state, and to analyze the motion pattern; and analyzing the viewing state of the user based on the stored learning information;

wherein the detecting of the face region depends upon results of the detecting of the human body region, wherein the detecting of the eye region depends upon results of the detecting of the face region, wherein the stored broadcasting signal comprises the video signal and the audio signal received from the selected channel, wherein a power is provided to the tuner for receiving the broadcasting signal in the power saving mode, and wherein the entering the power saving mode includes when it is determined that there is no user viewing the display apparatus for a predetermined time, only the output of the video signal is turned off while the output of the audio signal is maintained.

2. The power saving method of claim 1, wherein the detecting of the viewing state of the user includes determining if the user is in a sleep state.

3. The power saving method of claim 1, wherein the entering the power saving mode includes:

entering a first power saving mode if the user is determined as being absent or determined as being in a sleep state for a first time; and entering a second power saving mode if the user is determined as being absent or determined as being in the sleep state for a second time after entering the first power saving mode.

4. The power saving method of claim 3, wherein the entering the first power saving mode includes blocking an image output through the display apparatus, and the entering the second power saving mode includes blocking an image and voice output through the display apparatus.

5. The power saving method of claim 1, further comprising periodically determining if the power saving mode is cancelled by periodically acquiring the image.

6. A display apparatus comprising:

a camera to acquire an image by photographing surroundings of the display apparatus;

a processor including a power managing unit to manage a power supplied to components of the display apparatus;

a user recognizing unit to recognize a user viewing the display apparatus by analyzing the image acquired through the camera and detecting a human body region contained in the image, wherein the user recognizing unit comprises:

a human body detecting unit detecting the human body region contained in the acquired image;

a face detecting unit detecting a face region from the detected human body region;

an eye state recognizing unit recognizing an eye state of the user by detecting an eye region existing in the detected face region and analyzing the detected eye region;

a motion pattern analyzing unit to analyze a motion pattern of the user by analyzing motion change of the human body region detected from a plurality of images if the face region is not detected from the human body region; and a learning unit storing learning information to detect the human body region, the face region, and the eye region, to recognize an eye state, and to analyze the motion pattern;

wherein the user recognizing unit analyzes a viewing state of the user based on the stored learning information;

wherein the detecting of the face detecting unit depends upon results of the detecting of the human body detecting unit; and wherein the detecting of the eye state detecting unit depends upon results of the detecting of the face detecting unit; and a controller to determine a presence state of the user viewing the display apparatus according to a recognition result of the user recognizing unit, and to control entrance into a power saving mode based on the presence state of the user, wherein the controller determines that the user is absent if the human body region is not detected from the image and controls the power managing unit to enter the power saving mode;

wherein the controller is configured to:

receive a broadcasting signal corresponding to a channel selection command through a tuner, output a video signal and an audio signal of the received broadcasting signal through an output unit, initiate a storage of the broadcasting signal in a storage unit when the power saving mode is entered, and display a message to inform a user of the storage of the broadcasting signal in the storage unit when the power saving mode is canceled;

wherein the controller controls analysis of the detected human body region to determine if the human body region is detected from the image, and controls entrance into the power saving mode by detecting the viewing state of the user based on the analysis of the human body region;

wherein the controller controls the entrance into the power saving mode if the eye state of the user recognized by the eye state recognizing unit is in a closed state, or if the motion change of the user according to the analyzed motion pattern is not detected;

wherein the stored broadcasting signal comprises the video signal and the audio signal received from the selected channel, wherein the power managing unit provides a power to the tuner for receiving the broadcasting signal in the power saving mode, and wherein when the controller determines that the user is absent for a predetermined time to enter the power saving mode, only the output of the video signal is turned off while the output of the audio signal is maintained.

7. The display apparatus of claim 6, wherein the controller determines if the user is currently in a sleep state by detecting the viewing state.

8. The display apparatus of claim 6, wherein the controller controls to gradually enter the power saving mode depending on a lapse of a time during which the human body region is not detected, the eye state is recognized as the closed state, and the motion change of the user is not detected.

9. The display apparatus of claim 8, further comprising:
an image processing unit to process an image signal and output the processed image signal; and
a voice processing unit to process a voice signal and output the processed voice signal,
wherein the power managing unit enters a first power saving mode to shut off a power supplied to the image processing unit as the time elapses, and enters a second power saving mode to shut off a power supplied to both of the image processing unit and the voice processing unit as the time elapses.

10. The display apparatus of claim 6, wherein a power supplied to the camera and the user recognizing unit is continuously maintained when entering the power saving mode, and wherein the controller cancels the power saving mode according to image data acquired through the camera in the power saving mode and the presence state of the user recognized by the user recognizing unit.

\* \* \* \* \*